(12) United States Patent
Jones

(10) Patent No.: US 7,216,845 B1
(45) Date of Patent: May 15, 2007

(54) VALVE ACTUATOR

(76) Inventor: Dan Jones, 3239 F.M. 217, Valley Mills, TX (US) 76689

( * ) Notice: Subject to any disclaimer, the term of this patent is extended or adjusted under 35 U.S.C. 154(b) by 0 days.

(21) Appl. No.: 11/263,097

(22) Filed: Oct. 31, 2005

(51) Int. Cl.
*F16K 31/53* (2006.01)

(52) U.S. Cl. .................. 251/248; 74/640; 475/162

(58) Field of Classification Search ............... 251/248; 475/162; 74/640
See application file for complete search history.

(56) References Cited

U.S. PATENT DOCUMENTS

| | | | |
|---|---|---|---|
| 81,329 A | 8/1868 | Barden | |
| 107,432 A | 9/1870 | Zeigler | |
| 850,597 A | 4/1907 | McCanna | |
| 955,458 A | 4/1910 | Hampton | |
| 1,141,626 A | 6/1915 | Granville | |
| 1,270,950 A | 7/1918 | Johanson | |
| 1,538,008 A | 5/1925 | Sharkey | |
| 1,538,328 A | 5/1925 | Holdener | |
| 1,770,016 A | 7/1930 | Ruliancich | |
| 1,833,993 A | 12/1931 | Hill | |
| 2,475,504 A | 7/1949 | Jackson | |
| 3,037,400 A | 6/1962 | Sundt | |
| 3,043,164 A | 7/1962 | Sundt | |
| 3,668,947 A | 6/1972 | Waldorf | |
| 4,050,331 A * | 9/1977 | Braren ...................... | 475/168 |
| 4,099,427 A | 7/1978 | Fickelscher | |
| 4,193,324 A | 3/1980 | Marc | |
| 4,227,422 A | 10/1980 | Kawashima | |
| 5,080,638 A * | 1/1992 | Osborn ...................... | 475/162 |
| 5,292,289 A | 3/1994 | Ogata et al. | |
| 5,324,240 A | 6/1994 | Guttinger | |
| 5,484,345 A * | 1/1996 | Fukaya ...................... | 475/162 |
| 5,697,868 A | 12/1997 | Akeel | |
| 5,876,298 A * | 3/1999 | Kato et al. ................. | 475/162 |
| 6,220,115 B1 | 4/2001 | Hirn et al. | |
| 6,280,359 B1 | 8/2001 | Moskob | |
| 6,336,881 B1 | 1/2002 | Rapp | |
| 6,428,437 B1 | 8/2002 | Schlanger | |
| 6,453,772 B1 | 9/2002 | Moskob | |
| 6,490,941 B1 | 12/2002 | Hur | |

OTHER PUBLICATIONS

U.S. Appl. No. 10/869,303, filed Jun. 16, 2004, Jones.
U.S. Appl. No. 10/945,529, filed Sep. 20, 2004, Jones.
U.S. Appl. No. 10/963,104, filed Oct. 12, 2004, Jones.
Sumitomo Machinery Corporation of America, A Unique Concept in Speed Reducers & Gearmotors, 2002, United States.

\* cited by examiner

*Primary Examiner*—John Bastianelli
(74) *Attorney, Agent, or Firm*—Marcus W. Hammack

(57) ABSTRACT

A highly efficient apparatus for actuating a valve. An input mechanism drives the apparatus through an input member. Torque is increased as a plurality of driver discs eccentrically rotate about a central shaft member and engage an output member via low-friction, roller means. The output member engages a valve stem which opens or closes the valve.

30 Claims, 2 Drawing Sheets

VALVE ACTUATOR

BACKGROUND OF THE INVENTION

1. Field of the Invention

The present invention is directed toward an apparatus for extremely compact, efficient, durable, reliable, and cost-effective opening and closing of a flow control valve. In particular, the present invention provides a device having an output that rotates with reduced speed and increased torque relative to its input through the low friction, rolling engagement of its members.

2. Background Information

The ability to control flow of liquids, gasses, slurries, and other mixtures is vital to industries and economies throughout the world. Industries dependant on flow control technology range from water/wastewater and food/beverage to chemical and petroleum. Consequently, the applications range from complete environmental control inside indoor factories to harsh, outdoor environmental conditions. Thus, the vitality of a wide range of industries depends on reliable, efficient, and cost-effective methods of flow control.

In order to control and divert the flow of its respective matter, each of these industries depends on appropriate flow control valves designed for its particular application as well as appropriate methods and devices for their actuation. The typical actuation package includes a mechanical valve actuator driven by manual, electric, pneumatic, or hydraulic means. The mechanical valve actuator is typically in the form of a device for increasing the torque of the driving means while applying it to the stem of the flow control valve resulting in opening or closing the valve. These actuation devices must be capable of precisely, efficiently, and reliably opening and closing the flow control valves in a variety of positions and atmospheric conditions. Likewise, the device must be safe for the application and as cost-effective as the application will allow.

The mechanical actuation devices currently on the market utilize conventional torque-increasing technology such as spur, helical, bevel, and worm gears systems. However, a number of inherent deficiencies exist in these systems, which are well known in the art. For instance, in selecting the proper system, a trade-off exists between mechanical efficiency and size of the system. Furthermore, regardless of which system is selected, the inherent high-friction nature of these traditional systems causes inefficiency as well as the possibility of self-destruction. Additionally, sizing and material selection problems exist in that each of these systems must be designed for maximum loading (including shock loads) on each individual tooth. Finally, manufacturing traditional mechanical actuation devices is expensive, time consuming, and inflexible because of the nature of traditional manufacturing processes used to produce both housings and component parts that make-up these currently existing systems.

Significantly, it is well known in the art that one must consider whether efficiency or size of the system is more important. It is well known that spur and helical gear systems are the most efficiently operating traditional systems, but they are inherently large because of the way they must be aligned in order to operate properly. Conversely, bevel and worm gear systems are more compact in their alignment but operate at far inferior efficiencies because of the excessive friction and heat generated in these systems.

Although efficiencies are much greater in spur and helical gear devices, the efficiency and performance of these devices are still detrimentally impacted by the sliding frictional forces generated during their operation. In order to transfer torque, both helical and spur gears depend on the sliding engagement of individual gear teeth. It is well known that this sliding produces high frictional forces between the teeth, which can lead to total destruction of the system if not continuously and properly lubricated.

Furthermore, proper transfer of torque in these traditional systems is totally reliant on the strength of each individual gear tooth. As the input member of the system rotates at a given torque, the force from each single tooth of the input is transferred, one at a time, to each single tooth of the mating gear. As a result, each individual tooth must be designed to transfer the entire force of the system including any shock forces that may be introduced at any particular time. Additionally, any tooth breakage can lead to catastrophic failure of the entire system.

Finally, traditional means of manufacturing housing and components of current mechanical actuation devices are not only expensive and time consuming to set up and modify, but they are also expensive and time consuming to manufacture and produce. The housing for the traditional gear system consists of two or more cast parts assembled together; therefore, in order to either originally produce housings or modify existing designs, either new molds must be manufactured or modifications must be made to existing molds. Likewise, expensive tooling and highly skilled personnel are required for both the gears themselves and other major components of a standard gearbox.

In view of the limitations of products currently known in the art, a tremendous need exists for a valve actuation device that is compact, efficient, durable, reliable, and cost-effective. Applicant's invention, by its novel design provides a solution in view of currently available devices.

SUMMARY OF THE INVENTION

In view of the foregoing, it is an object of the present invention to provide a device for mechanical actuation of a flow control valve that is safe during operation and establishes a safe working environment.

It is another object of the present invention to provide a device for mechanical actuation of a flow control valve that is extremely compact in size.

It is another object of the present invention to provide a device for mechanical actuation of a flow control valve that is exceptionally mechanically efficient.

It is another object of the present invention to provide a device for mechanical actuation of a flow control valve that is extremely durable.

It is another object of the present invention to provide a device for mechanical actuation of a flow control valve that can withstand extreme shock forces.

It is another object of the present invention to provide a device for mechanical actuation of a flow control valve that is extremely reliable.

It is another object of the present invention to provide a device for mechanical actuation of a flow control valve that has exceptionally low internal friction.

It is another object of the present invention to provide a device for mechanical actuation of a flow control valve that has an excellent power to size ratio.

It is another object of the present invention to provide a device for mechanical actuation of a flow control valve that is highly cost-effective to manufacture.

In satisfaction of these and other related objectives, the present invention provides a device for mechanically actuating a flow control valve. This system provides for a highly efficient, durable, low friction, and cost-effective interface between the driving member and the valve stem of a flow control valve. As will be discussed in the specification to follow, practice of the present invention involves a combination of components so aligned to provide efficient actuation of a flow control valve in practically any environmental condition.

The preferred embodiment of the present invention incorporates an input shaft with dually eccentric lobes. Each lobe is offset from the input shaft center an equal distance but in diametrically opposing directions. A driver disc surrounds each eccentric, or offset lobe so spaced as to allow low-friction, rolling engagement between the eccentric lobe and the driver disc. By operation of the camshaft configuration (input shaft/eccentric lobe combination), as the input shaft rotates in a given direction, each driver disc is "pushed" outward against another low-friction, rolling mechanism embedded within the housing circumferentially about the outer diameter of the driver discs themselves. As each driver disc engages this outer rolling mechanism, each driver disc is forced to rotate about its respective center in the opposite direction of the input shaft. At the same time, each driver disc is forced to revolve about the input shaft in the same direction as the input shaft but at reduced speed and corresponding increased torque. This torque is transferred to an output member via a final low-friction, rolling engagement.

Because of the make-up and configuration of the component parts of the present invention, an extremely efficient torque increase may be transferred in a much more compact package than traditional systems. The torque increase in a traditional system is dependant on the relative diameters and alignment of each gear within the system. Since the outer diameters (gear teeth) must mate in order to transfer torque, the envelope within which the system can be placed is quite broad. In contrast, torque increase delivered by the present invention is dependent upon the amount of eccentricity and the radius of the driver discs in relation to the position of the members which transfer torque from the driver discs to the output member. Moreover, since this entire envelope is equal to the diameter of the driver disc plus twice the eccentricity, the device of the present invention is much more compact than that of traditional mechanical valve actuators.

Additionally, the mechanical efficiency of the present invention is extremely high because of the near elimination of friction within the system as compared to traditional valve actuators. Because traditional systems depend on the engagement of turning gear teeth, a significant amount of efficiency is lost due to the "sliding" friction generated between the mating teeth. However, all torque transfer in the present system is accomplished through low-friction, rolling engagement; therefore, because the present invention completely eliminates the "sliding" friction effect of traditional systems, it is able to operate at a significantly higher efficiency than traditional valve actuators.

The present invention is also able to withstand much higher loading (including shock loading) than traditional valve actuators. In traditional actuators, all loading is transferred between a single tooth of one gear mating with a single tooth of another gear; thus, at any given time all of the loading in the system is concentrated on a single gear tooth. In the present invention, loading is evenly distributed among multiple, rolling members, which, in turn, allows the system to withstand much higher loading than its traditional counterpart. Not only does this relate to a more robust system (compared to size), but it also results in a more reliable system because damage to one rolling member does not result in total system failure whereas a broken gear tooth does lead to total system failure. Therefore, the present design is much more durable and reliable than traditional valve actuators currently well known in the art.

The present invention, in its preferred embodiment, is extremely cost effective in view of more traditional valve actuators. The novel design of the present invention provides for a simple and cost-effective manufacturing process as opposed to traditional manufacturing techniques applied to current actuators. Whereas the traditional manufacturing methods of casting and extensive machining of a number of different sized components is laborious, time-consuming, and expensive, the present invention requires relatively very little in the way of lead or production costs. In the present invention, both the housing and the internal components of the device are laminated. That is, each component is comprised of a plurality of relatively thin pieces of source material, generally consisting of a metal alloy or some other suitably rigid material, which are individually cut and sandwiched together using an affixing means, such as pins or screws, to form the final primary components. Production by way of lamination greatly reduces both start up time and cost as well as production time and cost without sacrificing strength or quality. Start up time and cost are reduced by eliminating the need for long-lead casting and machining equipment. Correspondingly, production time and cost are reduced by eliminating the need for stocking and using materials of multiple thicknesses and by eliminating the need for extensive machining and highly skilled machinists to produce final primary components. Thus, when compared to traditional manufacturing of valve actuators currently known in the art, the present invention provides a substantially more cost-effective device than is presently available.

Finally, as is discussed in more detail hereafter, one embodiment of the present invention involves the substitution of a geared ring-like member as the outermost force transmission member (earlier versions of related inventions by the same inventor) with an assemblage comprised operationally of length(s) of roller chain. This substitution replaces that which would otherwise be a specifically manufactured, quite expensive component (a ring gear) with a readily available, durable and cost-effective substitute, thereby dramatically reducing cost of manufacture. Because forces transmitted to the roller chain-based ring gear structure are distributed over a number of tooth/roller chain length parings during operation of this embodiment of the present invention, the substitution of cast ring gears with the described roller chain assemblage is quite adequate for withstanding the forces expected to be transmitted during use of the device.

In summary, then, an embodiment of the present invention provides a highly cost-effective, small "footprint", and reliable torque reduction device for effecting the axial rotation of devices, such as valve stems of valves used in industrial contexts.

BRIEF DESCRIPTION OF THE DRAWINGS

Applicant's invention may be further understood from a description of the accompanying drawings, wherein unless otherwise specified, like referenced numerals are intended to depict like components in the various views.

DETAILED DESCRIPTION OF THE PREFERRED EMBODIMENT

Figure 1:
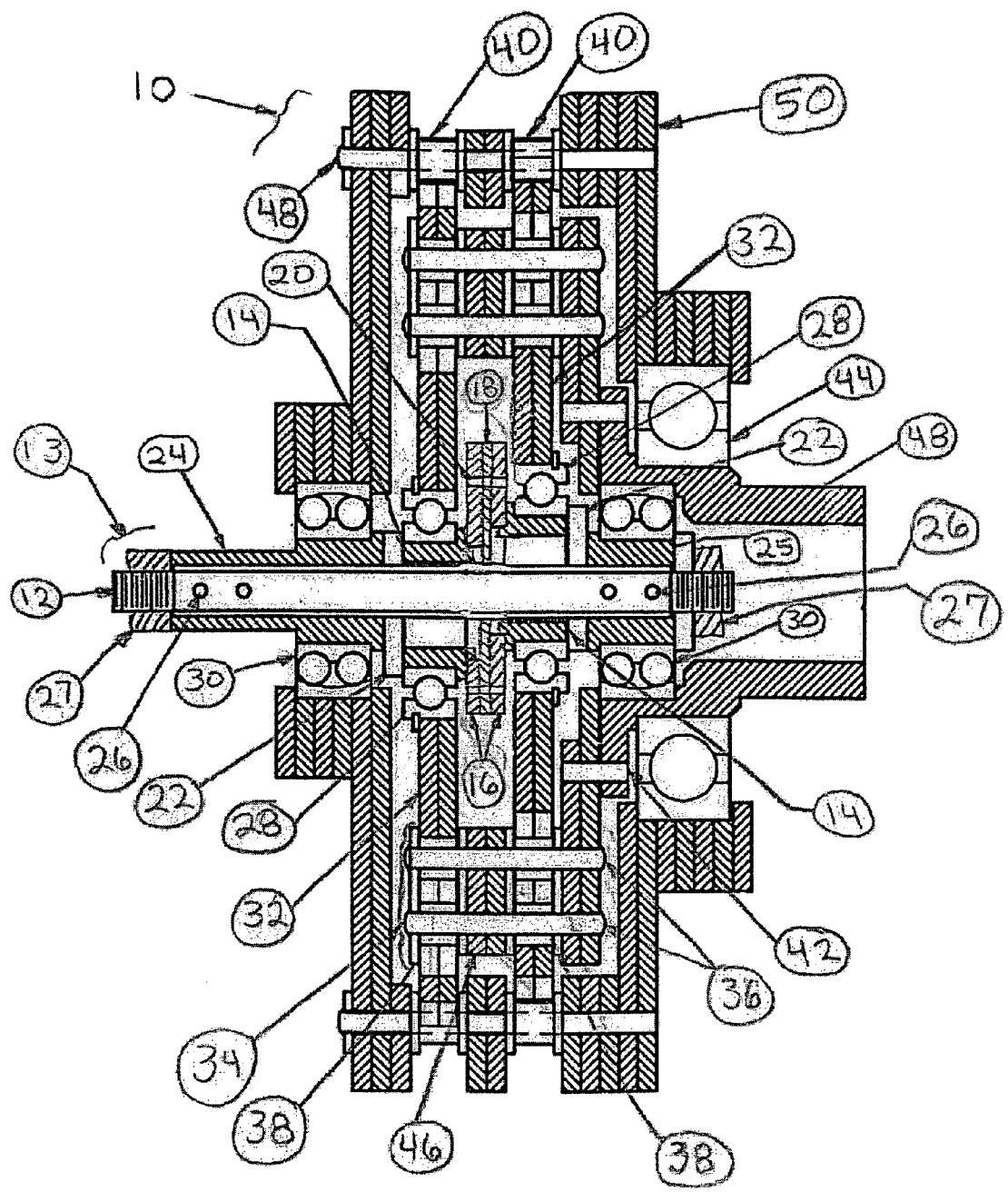
FIG. 1 is a cross-sectional view of the apparatus of the present invention.
Figure 2:
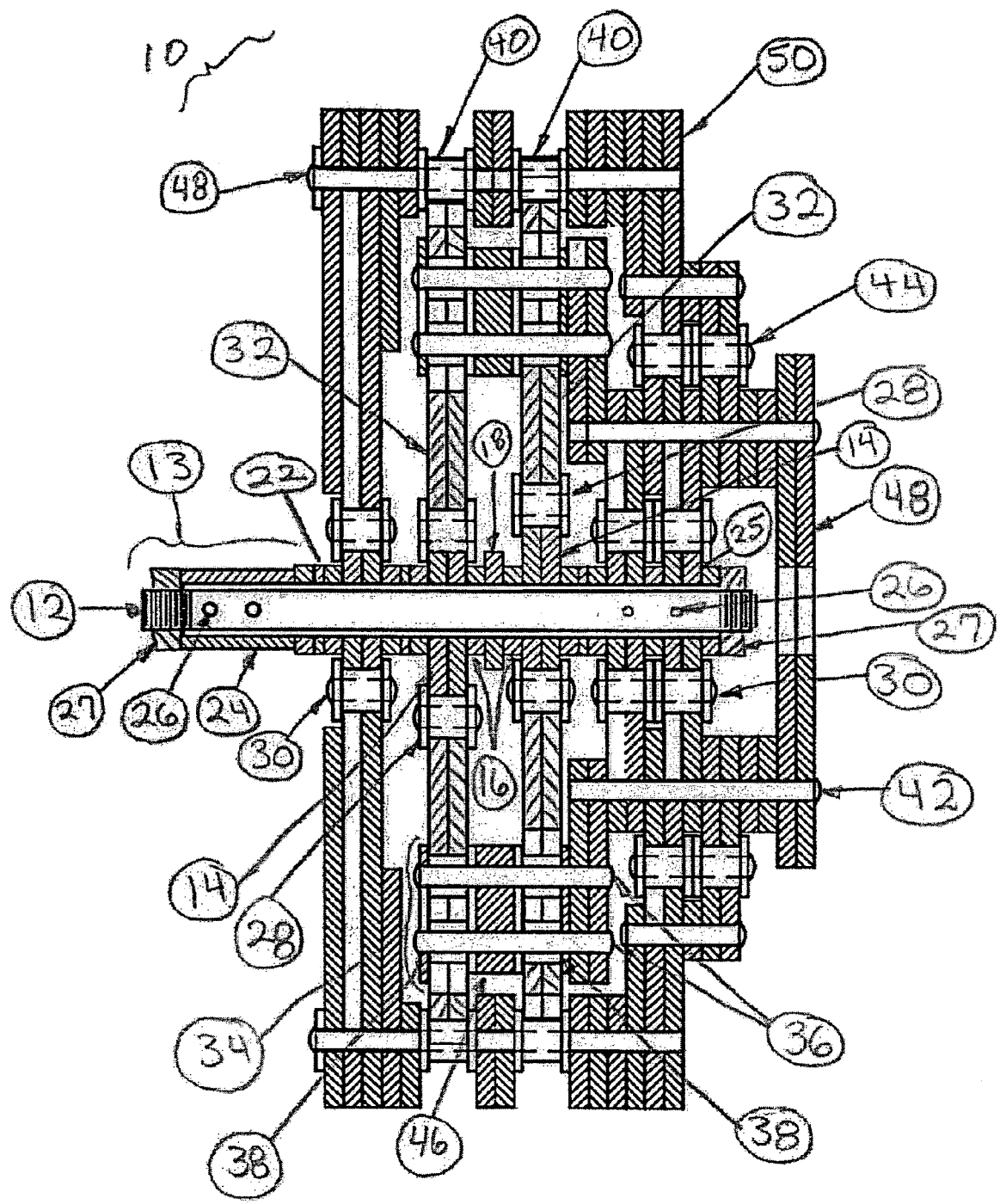
FIG. 2 is a cross-sectional view of an alternate embodiment of the present invention.

Referring to FIGS. 1 and 2, a device for actuating a flow control valve is shown and is generally designated by numeral 10. In the preferred embodiment, the primary components of the device are laminated. That is, each component is comprised of a plurality of relatively thin pieces of source material, generally consisting of a metal alloy or some other suitably rigid material, which are individually cut and sandwiched together using affixing means to form the final primary components. Production by way of lamination greatly reduces both start up time and cost as well as production time and cost without sacrificing strength or quality. Start up time and cost is reduced by eliminating the need for long-lead casting and machining equipment. Correspondingly, production time and cost is reduced by eliminating the need for stocking and using materials of multiple thicknesses and by eliminating the need for extensive machining and highly skilled machinists to produce final primary components.

As best seen in FIGS. 1 and 2, device (10) contains an input assembly (13) and an output member (48). In the preferred embodiment, input assembly (13) is centrally, axially aligned with output member (48). Input assembly (13) is a shaft assembly which mates with some external driving force either directly or via an appropriate coupling mechanism as is well known to one skilled in the art. The external driving force causes input assembly (13) to rotate with the same torque and velocity as the external driving force. Output member (48) adapts to mate with a valve stem allowing opening or closing valve to such position as desired.

As seen in FIGS. 1 and 2, input assembly (13) is composed of input member (12) encapsulated by several other members. In the preferred embodiment, input member (12) is generally in the shape of a cylindrical shaft, flattened on diametrically opposing sides. Alternative embodiments of input member (12) are envisioned in which the shape of the shaft is of another torque transmitting shape such as square, hexagonal or splined. As shown in FIGS. 1 and 2, input member (12) is encapsulated by center disc (18), which, in the preferred embodiment, has a circular through hole at its center point with flats to mate input member (12) when assembled. In alternative embodiments, the through hole in center disc (18) would comprise whatever ever shape matched that of input member (12). Working outward along the input member (12), lobe discs (16) sandwich the center disc (18). Each lobe disc (16) contains a through hole offset from the center of the lobe discs (16) with a diameter slightly larger than the outer diameter of the eccentric lobe members (14). In the preferred embodiment, the lobe discs (16) are affixed to the center disc via disc affixing means (20) such that the through holes are eccentrically offset from the input member (12) in diametrically opposing directions. In the preferred embodiment, disc affixing means (20) is a simple screw or pin combination wherein one or more screws or pins traverse both the center disc (18) and the lobe discs (16).

Still referring to FIGS. 1 and 2, and continuing to work outward along the input member (12), lobe members (14) insert into lobe discs (16) such that the center axis of each lobe member (14) is parallel with the center axis of input member (12) but centrally offset from input member (12) such that one lobe member (14) is offset from input member (12) in one direction, and the other lobe member (14) is offset from input member (12) by the same amount in the diametrically opposite direction. Continuing outward along input member (12), bushing members (22) sandwich lobe members (14). Each bushing member (22) also contains an offset, through hole with flats (or other appropriate shape) to mate the flats of input member (12) when assembled. Continuing outward along input member (12), input member sleeves (24, 25) sandwich bushing members (22). Input sleeve affixing means (26) affix input member sleeves (24, 25) to input member (12). In the preferred embodiment, input member affixing means (26) consist of both press fit and a simple pin combination wherein one or more pins traverse both input member sleeves (24, 25) and input member (12); however, other input member affixing means (26) are envisioned such as keys or splines, which would be apparent to one of ordinary skill in the art. Finally, compressing means (27) sandwich input member sleeves (24, 25) placing all components of input assembly (13) into compression except input member (12), which is placed in tension. In the preferred embodiment, compressing means (27) consists of two compression nuts threaded onto each opposing end of input member (12). Therefore, input assembly (13) forms the generic shape of a camshaft such that eccentric lobe members (14) rotate at the same velocity and with the same torque as input member (12).

Referring to FIGS. 1 and 2, an input roller means (30) engages each input member sleeve (24, 25) about its respective outer diameter. In one embodiment, as shown in FIG. 1, input roller means (30) is a standard ball bearing. In an alternate embodiment, as shown in FIG. 2, the input roller means (30) is a single or multiple wrap of roller chain. Other embodiments are envisioned where other input roller means are used such as standard roller bearings. In the preferred embodiment, on the input side of apparatus (10), input roller means (30) further engages housing member (50) about input roller means' (30) outer diameter allowing input assembly (13) to rotate freely within stationary housing member (50). On the output end of apparatus (10), input roller means (30) further engages output member (48) about input roller means' (30) outer diameter further allowing input assembly (13) to rotate freely with respect to output member (48).

Referring to FIGS. 1 and 2, each lobe member (14) is engaged around its outer diameter with a lobe roller means (28). In one embodiment, as shown in FIG. 1, lobe roller means (28) is a standard ball bearing. In an alternate embodiment, as shown in FIG. 2, the lobe roller means (28) is a single or multiple wrap of roller chain. Other embodiments are envisioned where other lobe roller means are used such as standard roller bearings. Again, referring to FIGS. 1 and 2, driver disc (32) of generally cylindrical shape engages the outer diameter of each lobe roller means (28) along the driver disc's (32) inner diameter. Lobe roller means (28) allow each lobe member (14) to rotate within each driver disc (32), while each driver disc (32) remains centrally aligned with respect to its corresponding lobe member (14).

As further seen in FIGS. 1 and 2, the outer diameter of each driver disc (32) is machined for interface with driver disc engagement means (40). In the preferred embodiment, each driver disc engagement means (40) consists of a single wrap of roller chain, which is inserted into stationary housing member (50) and held in place by housing affixing members (48). In the preferred embodiment, stationary housing member (50), is comprised of a plurality of relatively thin parts laminated together via housing affixing members (48), although alternate embodiments are envisioned in which the housing is manufactured using more conventional means such as a casting or a welded fabrication. Additionally, in the preferred embodiment, affixing members (48) are pins, but other embodiments are envisioned as would be apparent to one skilled in the art. Importantly, as input member (12) rotates in one direction, each lobe member (14) eccentrically sweeps around input member (12) in the same direction, in essence, pushing each driver disc (32) simultaneously at diametrically opposing points into the driver disc engagement means (40). This pushing action by way of the rotating, eccentric lobe members (14) results in the driver disc (32) "walking" along its engagement with the driver disc engagement means (40), in effect, causing each driver disc (32) to rotate about its respective center in a direction opposite to that of the input assembly (13), while at the same time, causing the driver disc (32) to revolve about input assembly (13) in the same direction as that of the input assembly (13) but at reduced speed and with a corresponding torque increase.

Referring to FIGS. 1 and 2, reduced speed and torque increase are transferred from the driver discs (32) to the output member (48) via a plurality of transferring members (34). In the preferred embodiment, transferring members (34) each consist of double roller chain links inserted through slots in driver discs (32). More specifically, each double roller chain link consists of two extended length pins (36) and four chain rollers (38). Referring to FIGS. 1 and 2, and working from the input end of apparatus (10), the transferring members (34) insert through the slot in one driver disc (32) allowing low friction, rolling engagement with that driver disc (32), through holes in center stabilizing disc (46) allowing engagement with the stabilizing disc (46), through slot in other driver disc (32) allowing low friction, rolling engagement with that driver disc (32), and finally through holes in output member (48) allowing engagement with output member (48). Therefore, as the driver discs (32) revolve at a reduced speed about input assembly (13), that reduced speed and corresponding torque increase is transferred directly to the output member (48) via a plurality of transferring members (34).

Finally, output member (48), in the preferred embodiment, is made up of a plurality of relatively thin parts laminated together via output member affixing means (42). In the preferred embodiment, output member affixing means (42) is a simple screw or pin combination wherein one or more screws or pins traverse all of the discs that make up output member (48). Referring to FIGS. 1 and 2, the outer diameter of output member (48) engages with the inner diameter of output roller means (44). Correspondingly, the outer diameter of output roller means (44) engages stationary housing member (50). In one embodiment, as shown in FIG. 1, output roller means (44) is a standard ball bearing. In an alternate embodiment, as shown in FIG. 2, the output roller means (44) is a single or multiple wrap of roller chain. Other embodiments are envisioned where other output roller means are used such as standard roller bearings. Therefore, output member (48) is free to rotate with respect to fixed housing member (50).

In operation, drive means is applied to the input assembly via coupling to input member sleeve (24) at a given input velocity and torque. Input member sleeve (24), in turn, transmits given velocity and torque via input member (12) to center disc (18) which, in turn transmits input velocity and torque to lobe members (14) via disc affixing means (20) and lobe discs (16). As lobe members (14) rotate, they create an eccentric sweep which "pushes" driver discs (32) outward into engagement with driver disc engagement means (40) via lobe roller means (28). The combination of the eccentric pushing of the lobe members (14), the low friction, rolling engagement between lobe members (14) and driver discs (32) via lobe roller means (28), and the low friction, rolling engagement of driver discs (32) and driver disc engagement means (40) causes driver discs (32) to simultaneously rotate about their own center in the opposite direction of input assembly (13) and revolve about input assembly (13) itself in the same direction as the input assembly (13) but at a reduced speed and corresponding torque increase. This reduced speed and corresponding torque increase is transmitted to output member (48) via a plurality of transmitting members (34), where it is applied directly or via coupling to the stem of a flow control valve in order to open or close the valve.

Although the invention has been described with reference to specific embodiments, this description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

I claim:

1. An apparatus for actuating a valve, comprising:
    an input member, said input member being configured for receiving and engaging a driving mechanism;
    an output member, said output member being configured for receiving and engaging a valve stem;
    a lobe member, said lobe member positioned with respect to said input member such that the axis of said lobe member is parallel to, but centrally offset from the axis of said input member, wherein said lobe member is rotationally coupled with said input member such that said lobe member and said input member share the same rotational velocity and torque;
    a driver disc, wherein said driver disc is engaged with said input member through said lobe member, wherein said driver disc is axially aligned with said lobe member, wherein said driver disc moves about said input member in eccentric fashion at reduced speed with respect to said input member as a response to rotational force applied to said input member by said driving mechanism;
    a transferring member, said transferring member being engaged with said driver disc such that said transferring member rotates about said input member, said transferring member being axially aligned with and rotationally coupled to said output member such that said transferring member and said output member share the same rotational velocity and torque; and
    a stationary housing member, wherein said stationary housing member substantially covers said input member, said output member, said lobe member, said driver disc, and said transferring member, wherein said stationary housing member engages said driver disc, said stationary housing member being configured to remain fixed with respect to the surrounding environment of said apparatus.

2. The apparatus of claim 1 wherein said input member and said stationary housing member are engaged with one another through a first input roller means.

3. The apparatus of claim 2 wherein said first input roller means is a ball bearing.

4. The apparatus of claim 2 wherein said first input roller means is roller chain.

5. The apparatus of claim 1 wherein said input member and said output member are engaged with one another through a second input roller means.

6. The apparatus of claim 5 wherein said second input roller means is a ball bearing.

7. The apparatus of claim 5 wherein said second input roller means is roller chain.

8. The apparatus of claim 1 wherein said output member and said stationary housing member are engaged with one another through an output roller means.

9. The apparatus of claim 8 wherein said output roller means is a ball bearing.

10. The apparatus of claim 8 wherein said output roller means is roller chain.

11. The apparatus of claim 1 wherein said eccentric lobe and said driver disc are engaged with one another through a lobe roller means.

12. The apparatus of claim 11 wherein said lobe roller means is a ball bearing.

13. The apparatus of claim 11 wherein said lobe roller means is roller chain.

14. The apparatus of claim 11 wherein said driver disc and said stationary housing member are engaged with one another through a driver disc engagement means.

15. The apparatus of claim 14 wherein said driver disc engagement means is roller chain.

16. An apparatus for actuating a valve, comprising:
an input member, said input member being configured for receiving and engaging a driving mechanism;
an output member, said output member being configured for receiving and engaging a valve stem;
a first lobe member, said first lobe member positioned with respect to said input member such that the axis of said first lobe member is parallel to, but centrally offset from the axis of said input member, wherein said first lobe member is rotationally coupled with said input member such that said first lobe member and said input member share the same rotational velocity and torque;
a second lobe member, said second lobe member positioned with respect to said input member such that the axis of said second lobe member is parallel to, but centrally offset from the axis of said input member the same distance as said first lobe member but in diametrically opposite direction, wherein said second lobe member is rotationally coupled with said input member such that said second lobe member and said input member share the same rotational velocity and torque;
a first driver disc, wherein said first driver disc is engaged with said input member through said first lobe member, wherein said driver disc is axially aligned with said first lobe member, wherein said driver disc moves about said input member in eccentric fashion at reduced speed with respect to said input member as a response to rotational force applied to said input member by said driving mechanism;
a second driver disc, wherein said second driver disc is engaged with said input member through said second lobe member, wherein said second driver disc is axially aligned with said second lobe member, wherein said second driver disc moves about said input member in eccentric fashion at reduced speed with respect to said input member as a response to rotational force applied to said input member by said driving mechanism;
a plurality of transferring members, said transferring members being engaged with said first and second driver discs such that said transferring members rotate about said input member, said transferring members being axially aligned with and rotationally coupled to said output member such that said transferring members and said output member share the same rotational velocity and torque; and
a stationary housing member, wherein said stationary housing member substantially covers said input member, said output member, said first and second lobe members, said first and second driver discs, and said plurality of transferring members, wherein said stationary housing member engages said first and second driver discs, said stationary housing member being configured to remain fixed with respect to the surrounding environment of said apparatus.

17. The apparatus of claim 16 wherein said input member and said stationary housing member are engaged with one another through a first input roller means.

18. The apparatus of claim 17 wherein said first input roller means is a ball bearing.

19. The apparatus of claim 17 wherein said first input roller means is roller chain.

20. The apparatus of claim 16 wherein said input member and said output member are engaged with one another through a second input roller means.

21. The apparatus of claim 20 wherein said second input roller means is a ball bearing.

22. The apparatus of claim 20 wherein said second input roller means is roller chain.

23. The apparatus of claim 16 wherein said output member and said stationary housing member are engaged with one another through an output roller means.

24. The apparatus of claim 23 wherein said output roller means is a ball bearing.

25. The apparatus of claim 23 wherein said output roller means is roller chain.

26. The apparatus of claim 16 wherein said first lobe member and said first driver disc are engaged with one another through a first lobe roller means, and said second lobe member and said second driver disc are engaged with one another through a second lobe roller means.

27. The apparatus of claim 26 wherein said first and second lobe roller means are ball bearings.

28. The apparatus of claim 26 wherein said first and second lobe roller means are roller chains.

29. The apparatus of claim 26 wherein said first driver disc and said stationary housing member are engaged with one another through a first driver disc engagement means, and said second driver disc and said stationary housing member are engaged with one another through a second driver disc engagement means.

30. The apparatus of claim 29 wherein said first and second driver disc engagement means are roller chains.

* * * * *